United States Patent
Johansson et al.

(10) Patent No.: US 8,180,344 B2
(45) Date of Patent: May 15, 2012

(54) CELL RESELECTION FOR DUAL MODE MOBILE STATIONS IN A COMMON 2G/3G TELECOMMUNICATIONS NETWORK

(75) Inventors: Stefan Johansson, Linköping (SE); Håkan Persson, Solna (SE); Pär Ingemar Gustavsson, Linköping (SE); Thomas Johansson, Åby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 947 days.

(21) Appl. No.: 11/921,568

(22) PCT Filed: May 31, 2006

(86) PCT No.: PCT/EP2006/062765
§ 371 (c)(1),
(2), (4) Date: Dec. 5, 2007

(87) PCT Pub. No.: WO2006/134027
PCT Pub. Date: Dec. 21, 2006

(65) Prior Publication Data
US 2009/0233600 A1    Sep. 17, 2009

(30) Foreign Application Priority Data
Jun. 14, 2005    (SE) ........................................ 0501342

(51) Int. Cl.
*H04W 4/00* (2009.01)
(52) U.S. Cl. .................................. 455/435.2; 455/422.1
(58) Field of Classification Search .................... 455/436
See application file for complete search history.

(56) References Cited

U.S. PATENT DOCUMENTS

| | | | | |
|---|---|---|---|---|
| 6,920,317 B1 * | 7/2005 | Muhonen | ....................... | 455/405 |
| 7,454,213 B2 * | 11/2008 | Tolli | ............................... | 455/453 |
| 2002/0197992 A1 * | 12/2002 | Nizri et al. | ..................... | 455/435 |
| 2006/0235958 A1 * | 10/2006 | Motoyama | .................... | 709/223 |

FOREIGN PATENT DOCUMENTS

| | | |
|---|---|---|
| EP | 1 220 557 | 7/2002 |
| WO | 2004/019644 | 3/2004 |

OTHER PUBLICATIONS

Furternback R-M et al., "GSM and WCDMA-Common Network Approach", *Ericsson Review*, No. 2, 2004, pp. 82-89, XP001224639.
Digital cellular telecommunications system (Phase 2+); Radio sub-system link control (3GPP TS 45.008 version 6.12.0 Release 6), *ETSI Standards*, vol. 3-GI, No. V6120, Apr. 2005, XP014028369.
International Search Report for PCT/EP2006/062765 mailed Sep. 25, 2006.

* cited by examiner

*Primary Examiner* — Charles Appiah
*Assistant Examiner* — Natasha Cosme
(74) *Attorney, Agent, or Firm* — Nixon & Vanderhye P.C.

(57) ABSTRACT

A 2G controlling entity in a common 2G/3G network that includes a common Core Network is connected to dual mode mobile stations and to a 3G controlling entity also connected to dual mode mobile stations. The 2G controlling entity applies a 3G camping strategy and receives a service request, for a service at least supported by the 2G network, from a dual mode mobile station. The 2G controlling entity instructs the dual mode mobile station, when connected to the 2G network, to perform cell reselection evaluation of 3G network cells only when the 2G network signal strength is below a predetermined threshold.

16 Claims, 3 Drawing Sheets

CELL RESELECTION FOR DUAL MODE MOBILE STATIONS IN A COMMON 2G/3G TELECOMMUNICATIONS NETWORK

TECHNICAL FIELD

The technology relates to a method and arrangements in a common 2G/3G network, and in particular, to the distribution of dual mode mobiles in a common 2G/3G network.

BACKGROUND

With the introduction of the 3rd generation (3G) mobile telephony system, the Wideband Code Division Mobile Access (WCDMA) based Universal Mobile Telephony System (UMTS), new opportunities are given to provide even more advanced services to the subscribers. Examples of such services are video telephony, high-bit-rate packet data services etc. The 2nd generation (2G) mobile telephony systems GSM/GPRS have evolved to handle more advanced services. The introduction of EDGE has for example enhanced the packet data services by providing higher bit rates. Many services are supported equally well by both the second and third generation systems such as voice services, SMS, low to medium high bit-rate packet data services etc., while other services such as high-bit-rate packet data services (384 kbit/s) are only supported by 3G. The third generation mobile stations are currently dual mode phones supporting both 2G and 3G in order to cope with the case where one of the network loses coverage.

GSM operators with a UMTS license are interested in still making use of the investments made in the GSM/GPRS/EDGE networks also after building out a parallel WCDMA based network. This will be especially interesting in the future when the number of dual mode mobile station increases and the number of GSM only mobile stations will start to decrease. In the paper "GSM and WCDMA-Common network approach" Ericsson Review, Vol. 81 (2004):2, pp 82-89 by Ros-Marie Furtenback, Torsten Hunte, Dalibor Turina and Ulrik Wahlberg:, a common network approach is presented and an analysis is made of which traffic steering mechanisms are needed in order to achieve a true common GSM/WCDMA network. Such a common GSM/WCDMA network 100 is shown in FIG. 1. The UMTS radio access network (UTRAN) 110 is connected to the common core network 102 via a first controlling entity, the Radio network Controller RNC 106, and the radio network of the GSM network 108 is connected to the common core network 102 via a second controlling entity, the Base Station Controller BSC 104. It should be noted that the BSC is further connected to a plurality of base stations that communicates wirelessly with the mobile stations and the RNC is in a similar way connected to a plurality of base stations, also referred to as Node Bs adapted to communicate wirelessly with the mobile stations. The arrow denoted 112 indicates directed retry or handover. In an ideal common network the subscribers are unaware of which system that provides the services as long as the subscriber perceives a seamless service level in terms of quality of service (QoS). One of the issues that is described in the above mentioned paper is how to distribute the traffic generated by the dual mode mobile stations on the GSM and the UMTS in areas where both systems have a similar coverage. The distribution should ideally be made in such a way that the network resources in both the GSM and UMTS networks are utilized in an optimal way and at the same time providing the subscribers the services they are requesting and in such a way that the subscribers perceive a seamless common network.

It may also be possible that a service is supported in 2G only, e.g. due to a decision of the operator. An MS camping in 3G is then directed to 2G by certain means (e.g. cell reselection), in order to execute the service. When the service is completed, the 3G camping MS is then returned to the 3G network which results in that the service can not be executed without a further direction to the 2G network. These unnecessary directions between the network causes an increased signalling.

Camping

One of the current approaches is to let the dual mode mobiles camp in the 3G network, i.e. apply the 3G camping strategy. An MS is said to camp on a cell when the MS is in idle mode, packet idle mode and packet transfer mode. An MS camping on a cell has completed cell selection/reselection process and has chosen a cell from which it plans to receive all available services.

3G Camping Strategy

In the 3G camping strategy, the dual mode MSs will camp in the 3G network as soon as the 3G coverage exists regardless of the 2G radio network condition. In case of high load in the 3G network, a part of the service requests, service requests for services supported in 2G typically speech services, are directed to the 2G network either at service establishment (directed retry) or during service (handover of circuit services, cell reselection of packet switched services).

As long as the 2G network has capacity left it accepts the directed retry and handover requests. If the load in the 2G network is high the directed retry and handover requests are rejected. It should be noted that the 2G network is of course also required to handle the 2G single mode mobile stations. Directed retry is a handover during the establishment of a call, i.e. only the signalling channel used during the call establishment is handed over. When the service session ends the dual mode mobiles station returns to idle mode and camps again in the 3G network in order to always have access to the 3G services not provided by the 2G network. Cell-reselection from 3G to 2G may also be performed due to that a requested service is only supported in the 2G network.

One drawback with this alternative is the delayed call set-up times caused by the directed retry and the extra traffic load generated by the handovers and cell reselections. Another drawback with this alternative is the fact that the periodic mobility management signalling (periodic location update) for all dual mode MSs will take place in 3G network and extra mobility management signalling will also take place when the dual mode MS moves between the 2G and the 3G systems. That implies that the number of directed retry and inter system handovers due to traffic load balancing between 3G and 2G network should be kept to a minimum.

Thus, it would be desirable to be able to distribute the dual mode mobile stations in the UMTS and the GSM network. In an ideal common GSM/UMTS network the GSM single mode mobile terminals are camping in GSM together with a portion of the dual mode mobile stations (MS), more specifically the dual mode MSs that do not use "UMTS only provided" services but services that are supported by both GSM and UMTS. The dual mode MSs, that are using services that only are supported by UMTS network, are camping in the UMTS network together with a part of the dual mode MSs using services supported by both GSM and UMTS networks. The distribution of the dual mode MS not using "UMTS only provided" services are distributed in such a way that the UMTS network capacity limit is not exceeded. With the distribution described above the directed retry and handovers between the systems due to traffic load balancing would be minimized. This alternative needs support for directed retry from GSM to UMTS at call set-up, in order to guarantee that subscribers using dual mode MS always have access to all UMTS services even if camping in the GSM system at initiate of the call set-up.

In the above mentioned paper, a solution is disclosed that bases the distribution of idle mode dual mode MSs by restricting location registrations. The restriction can for example be based on the subscriptions related to the dual mode MS. One drawback with this solution is the granularity, i.e. all dual mode MSs with a certain subscription are forced to camp either in GSM or in UMTS. Thus, all dual mode MSs will apply exactly the same algorithm when being in idle mode. With a UMTS camping strategy this implies that all dual mode MSs will camp in UMTS as soon as a UMTS cell fulfils the cell reselection algorithm criteria. Another drawback with this solution is the fact that the load within the radio network is not taken into account when deciding where the dual mode MS shall camp.

The cell reselection criteria from GSM to UMTS are (further details can be found in 3GPP TS 45.008):
1) The quality (measured in Ratio of energy per modulating bit to the noise spectral density) of the UMTS cell is above a minimum quality threshold.
2) The "signal strength" (measured in Received Signal Code Power) of the UMTS cell is above a minimum threshold.
3) The "signal strength" of the UMTS is stronger than the signal strength of the serving and neighbouring GSM cells plus an offset parameter.

A UMTS camping strategy implies that the offset parameter mentioned above must be set to a value promoting the MS to camp on the UMTS cell in the comparison with the GSM cells, otherwise the dual mode MS will be kept in GSM if the GSM cell/s are strong.

With an overlapping GSM and UMTS coverage this means that all dual mode MS will end up in a UMTS cell as soon as a UMTS cell is good enough.

The current telecommunications standards do not provide the network with enough steering mechanisms to control the idle mode camping behaviour of dual mode mobile stations. The cell reselection algorithm performed by dual mode MS take only the radio condition of the GSM and the UMTS network into account. Depending on camping strategy this results in that a majority of the dual mode MSs are camping in the GSM or the UMTS network. The behaviour of the dual mode MSs in terms of which services it uses is not taken into account. This further on makes it impossible to accomplish an optimal distribution of dual mode MS in the common GSM and UMTS network already in idle mode.

To achieve an efficient usage of the resources in the common network at high traffic load, solutions have to rely on existing procedures such as directed retry at call set-up and inter system handover/cell reselection during ongoing calls/packet sessions. However, these procedures imply a delay on the call set-up time, extra traffic is generated in the network nodes and the mobility management signalling increases.

It is also not possible to keep an MS during a service session within the 2G access if mobile controlled mode of operation is used, since the cell reselection strategy in 3G camping, would move the MS back to 3G whenever the algorithm detects that 3G coverage is present and is good enough. This will create delays in switching to 3G and losing data will yield poor quality of service and may also, if the service is only provided in 2G, loose the service session. Certain broadcast services may be sent at different speeds in 2G and 3G and changing access may create a big loss of data.

SUMMARY

I summary of the invention har jag inte lagt till det som föreslagits

Thus, desired objects are to provide a method and arrangements for utilizing the common 2G/3G network in an optimal way and at the same time minimize the inter system handovers, minimize the inter system cell reselection, and distribute the mobility management traffic between the 2G and the 3G networks.

A method comprises instructing dual mode mobile stations to perform cell reselection evaluation of 3G network cells for 2G network camping mobiles only when the 2G network signal strength is below a predetermined threshold. This makes it possible to utilize the common 2G/3G network in an optimal way and at the same time minimize the inter system handovers, minimize the inter system cell reselection, and distribute the mobility management traffic between the 2G and the 3G networks.

An arrangement comprises means for instructing dual mode mobile stations to perform cell reselection evaluation of 3G network cells for 2G network camping mobiles only when the 2G network signal strength is below a predetermined threshold, makes it possible to utilize the common 2G/3G network in an optimal way and at the same time minimize the inter system handovers, minimize the inter system cell reselection and distribute the mobility management traffic between the 2G and the 3G networks.

An advantage is that an operator that has both a GSM and UMTS networks can optimize the usage of the common network by distributing dual mode MSs to both systems already in idle mode in such a way that the number of directed retry and inter system handover/cell reselections is minimized.

A further advantage is that the dual mode MSs that will camp in the GSM network are the ones that normally does not use UMTS services. The dual mode MS that starts using "UMTS only provided" services will be directed back to UMTS.

A further advantage of is that resources are released in the UMTS network to subscribers using services that only are supported in the UMTS network, by letting a part of the dual mode MS camp and be served in the GSM network.

A further advantage is that when the penetration of GSM only mobiles declines, the GSM network can start to serve more and more dual mode MS that are satisfied with the services provide by the GSM network. The common network is utilized in an optimal way.

A further advantage is that a portion of dual mode MS that are ordered to camp in the GSM system is automatically adjusted depending on the load of the UMTS and the GSM system.

A further advantage is that the mobility management signalling is distributed on both the GSM and the UMTS network, since the distribution of the dual mode MS is made in idle mode.

DRAWINGS

DETAILED DESCRIPTION

Figure 1:
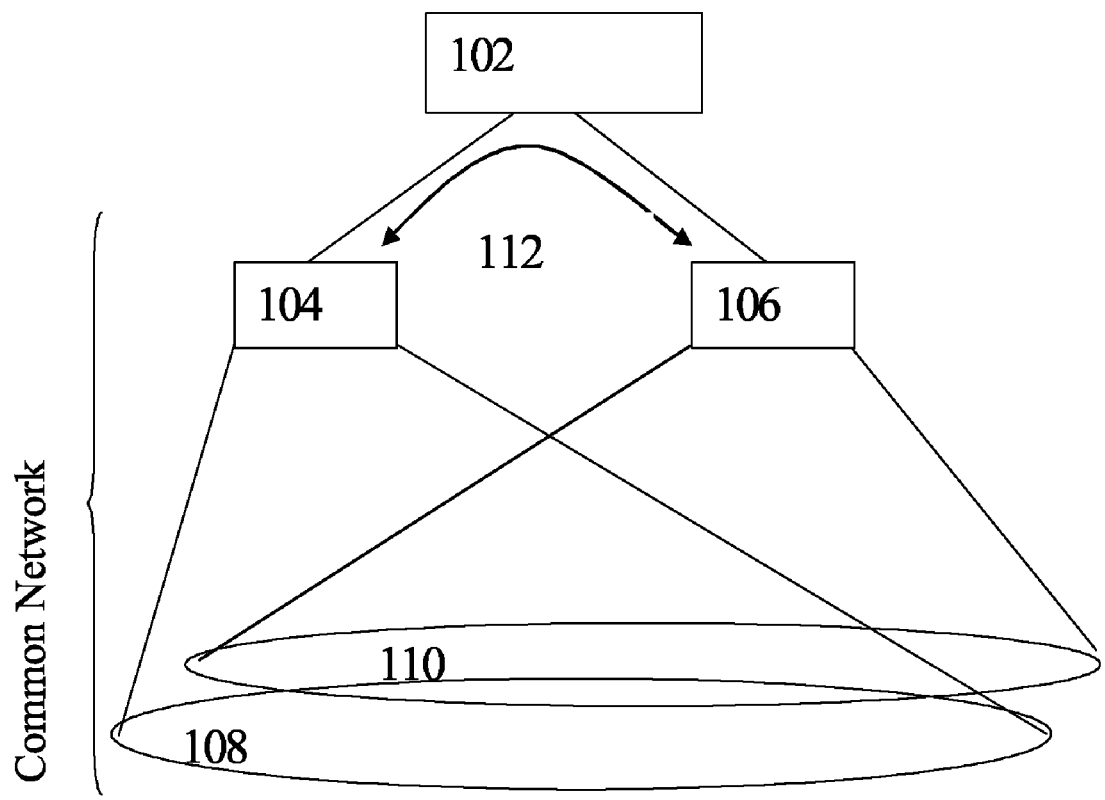
FIG. 1 shows a common GSM/UMTS network schematically.

The technology will be described more fully hereinafter with reference to the accompanying drawings, in which preferred embodiments are shown. This technology may, however, be embodied in many different forms and should not be construed as limited to the embodiments set forth herein.

The relates to a method and arrangements for distribution of idle mode dual mode mobile stations (MSs) in a common 2G/3G network in such a way that the number of directed retry of call set-ups from the 2G network to the 3G network and the number of inter system handovers/cell reselection between the 2G network and 3G network, in both directions, are minimized. In addition, the number of mobility management signalling, i.e. Location Area updates and Routing Area updates are also minimized.

The technology is implemented in a common 2G/3G network with overlapping similar good coverage of both the 2G network and the 3G network, wherein a 3G network camping strategy for dual mode MSs in idle mode, packet transfer mode and packet idle mode is used, i.e the 3G network is selected when the 3G network offers a sufficient coverage independent of the coverage of the 2G network. The 2G network is herein exemplified with a GSM network and the 3G network is herein exemplified with a WCDMA-based UMTS network, also denoted WCDMA network. It should however be noted that the technology is not limited to GSM or UMTS.

Thus, dual mode MSs are permitted to camp in the WCDMA network as long the capacity of the WCDMA network is enough to cope with the traffic generated by the dual mode MSs. When the traffic in the WCDMA system reaches a certain load threshold, a part of the service requests and/or ongoing service sessions are directed to the GSM network instead. This is done via directed retry (i.e. handover procedures performed at call set up) or handover procedures of already established calls. It is only services that are supported by both WCDMA and GSM, typically speech services or only by GSM, that are directed to the GSM network. The cause value of the directed retry and the handover procedures are set to "directed retry" indicative of lack of service support or directed retry due to high load. Thus the cause value is a parameter indicating the cause of the handover.

The redirected service request and the handover are accepted in the GSM network as long as the traffic load so permit, otherwise the directed retry and handover requests are rejected.

At reception of the directed retry and handover with a cause value indicating high traffic load, these dual mode MSs are kept in the GSM network until the dual mode MS requests and successfully establishes a service that is not supported in the GSM network.

In order to keep dual mode MS in idle mode, packet idle mode and packet transfer mode in the GSM network, support is introduced to be able to individually control the cell reselection behaviour of the dual mode MS by adding a new cell reselection condition to the GSM to WCDMA cell reselection algorithm in addition to already existing conditions.

The individual control is accomplished by adding a new cell re-selection parameter which is further described below.

The resulting behaviour is a flow of dual mode MSs between the WCDMA and GSM system to begin with.

Dual mode MSs that do not request any "WCDMA only provided"-services will be kept in the GSM network, whilst dual mode MS requesting "WCDMA only provided"-services will be directed back to the WCDMA network. In the long run this means that a part of the dual mode MS, i.e. the ones that only use services equally good served in the GSM network, will be filtered out to camp in the GSM network. This also implies that WCDMA capacity is made available for dual mode MS requesting "WCDMA only provided"-services.

As stated above, a desired scenario is that a portion of the dual mode MSs, i.e. the ones that typically only uses the speech service, and the ones using services only provided by the 2G network, will camp in the GSM network, whilst the dual mode MS users using high bit-rate packet services are kept in the WCDMA network.

The following existing mechanisms may be employed;
  Directed retry between GSM and WCDMA network. Inter system handover between GSM and WCDMA, specified in 3GPP.
  Inter system cell reselection between GSM and WCDMA, specified in 3GPP.
  Inter system packet handover, standardisation currently ongoing within 3GPP. This mechanism is however optional, but improves the performance.
  Sending of Service indicators on the A, Gb and Iu interface as specified in 3GPP. These service indicators, defined by the parameter Service Handover in the A-interface (BSSAP), by the parameter Service UTRAN CCO in the Gb-interface (BSSGP) and by the parameter Service Handover in Iu-interface (RANAP), indicate in which radio access technology (i.e. in GSM or in WCDMA) a service should, should not or shall be served. Further description of the above mentioned interfaces and protocols can be found in the specifications 3GPP TS 48.008, TS 48.018, and TS 25.413.
  Inter system handover between GSM and WCDMA of CS services are possible to trigger based on the traffic load in the networks.

Thus, the standard specifications 3GPP TS 44.018 and TS 44.060 have to be changed in order to make it possible to individually override the setting of the following system information parameters that controls when to start measuring of WCDMA cells. The parameter-Qsearch_I, defines when to start measurement of WCDMA cells in Idle mode and the parameter Qsearch_P, defines when to start measurement of WCDMA cells in Packet Transfer mode. The Qsearch parameters indicate a signal strength. Further details of the Qsearch parameters can be found in chapter 9 of 3GPP TS 45.008.

A new cell reselection condition is preferably introduced to the 2G network to the 3G network cell reselection algorithm. This new cell reselection condition is in addition to the already existing conditions indicated by Qsearch_i and Qsearch_P. The new condition decides when the evaluation of WCDMA cells concerning cell re-selection shall start and is expressed as a 2G network signal strength threshold value. The difference between the new condition, associated with the parameter denoted "evaluation threshold" and the condition indicated by Qsearch_i and Qsearch_P, respectively, is that the new condition decides when the measured 3G cells shall be taken into account in the 2G to 3G cell reselection algorithm whilst the Qsearch parameters decides when to start measuring on 3G cells. This means that the measurement on 3G cells can start before the evaluation start. The new cell reselection condition is defined so that cell re-selection evaluation of 3G network cells is performed unless the 2G network signal strength has decreased below the given threshold value. This threshold parameter is herein denoted "evaluation_threshold".

Figure 2:
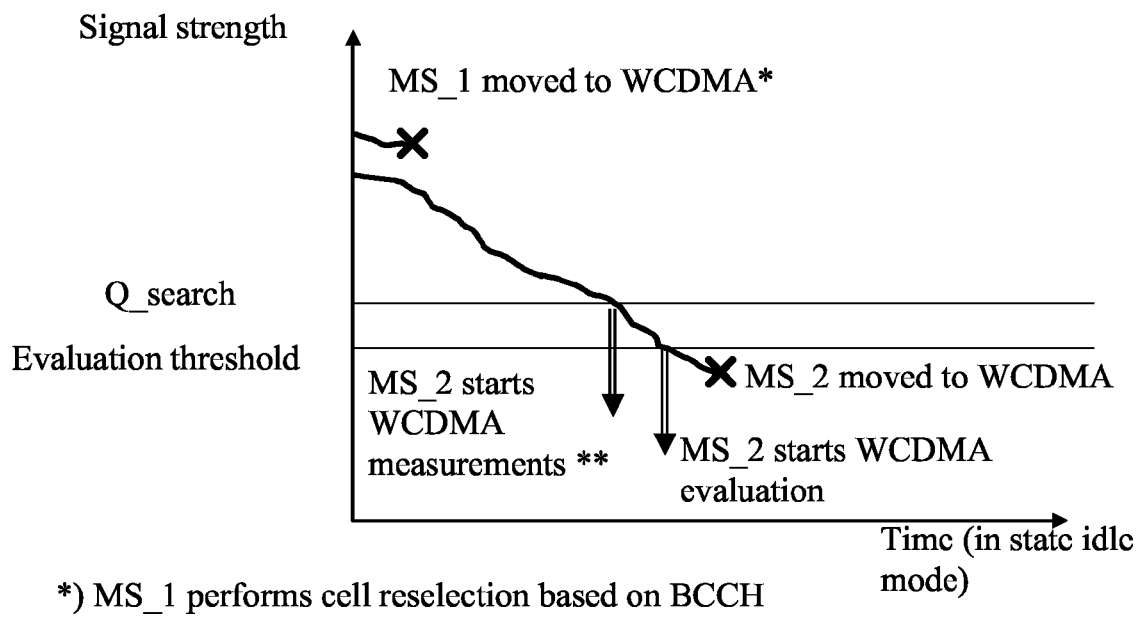
FIG. 2 illustrates an example of individual setting of cell re-selection parameters.
Figure 3:
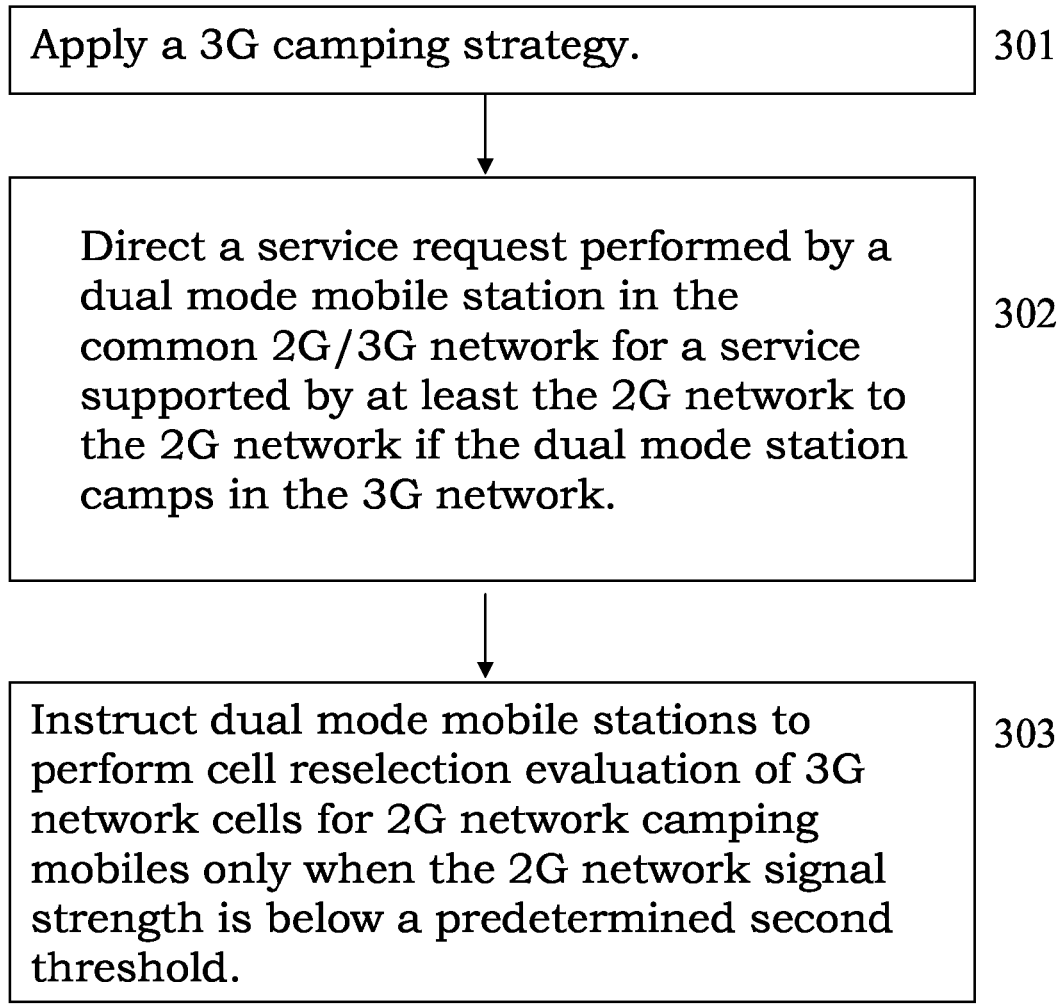
FIG. 3 is a flowchart of an example method.

The "evaluation_threshold" parameter is according to a first example embodiment broadcasted via system information messages. Thus, the "evaluation_threshold" parameter may be broadcast if it is possible to treat all mobiles in a similar way or sent to a certain group of mobile stations when the mobile stations within that certain group are affected in a similar way. Otherwise, the "evaluation_threshold" parameter is according to a second embodiment set individually. Individual setting makes it possible to control the dual mode mobile stations individually. Moreover, at least a second parameter, i.e. at least one of the Qsearch parameters, is set individually, wherein the Qsearch parameters indicate when to start to measure on the 3G network for the dual mode mobile station. FIG. 2 illustrates how cell reselection can be affected with an individual setting of cell reselection parameters. In this example it is assumed that the WCDMA camping strategy is used. After call release MS_1 therefore selects a WCDMA cell as soon as there is WCDMA coverage whereas MS_2, which has been provided with individual cell reselection parameters, camps in GSM until the GSM coverage is bad.

The parameters Qsearch_I, the Qsearch_P indicating when to start measuring on 3G cells may also be set individually, per dual mode MS. The Qsearch parameters and the "evaluation_threshold" may for example be communicated to the dual mode MS by adding the individual setting as an "Override 3G Measurement & 3G Evaluation Parameters" structure in the already existing messages such as Channel Release (3GPP TS 44.018) and/or Packet Measurement Order (PMO, 3GPP TS 44.060). It may also be sent to a certain group of mobiles, or a single mobile, using e.g. Multimedia Broadcast Multicast Service (MBMS) Assignment and/or MBMS Neighbour Cell Information messages. It should however be noted that the technology is not limited to the mentioned messages, other messages may also be used which is obvious for a man skilled in the art. The "evaluation threshold" and the Qsearch parameters may be transmitted to a dual mode mobile station during an initialisation of a service. E.g. a dual mode MS connected to the 2G network may receive an individual setting by means of the "evaluation threshold" and the Qsearch parameters during initialisation of a service that is only supported by the 2G network. Thus, during the service session the MS should remain in 2G network and not move back to 3G unless the 2G coverage is lost or if another, higher prioritised service is initiated. The "Override 3G Measurement & 3G Evaluation Parameters" structure implies that as soon as the dual mode terminal has received the individual parameter setting above, a corresponding setting received on the broadcast channel (BCCH or PBCCH) shall be replaced by the individual setting. In addition, the individual setting shall according to one example embodiment last until one of the following criteria are fulfilled:

- A new individual setting has been received in a new Channel Release or a Packet Measurement Order (PMO) message, or another message, e.g. a MBMS message.
- The dual mode terminal changes Location Area, Routing Area, or both.
- The dual mode terminal has changed radio access technology (RAT), for example a change from GSM to WCDMA due to loss of GSM coverage.
- The dual mode terminal has powered off/on.

It would however be desirable that the individual setting survives power off/on, but that is complicated to support in the terminal.

Furthermore, the individual setting may last only until the service session is finished depending on the operator setting, e.g. if an MBMS session has ended.

As stated above, it is here assumed that the radio network configuration in the 2G network and the 3G network promotes camping in the 3G network for dual mode mobiles, denoted the 3G camping strategy. This means that without using the new "evaluation threshold" parameter the dual mode mobiles will camp in the 3G network as soon as the 3G network coverage exists.

In the WCDMA based network a directed retry (inter system handover of the signalling channel during call set-up) or an inter system handovers towards GSM is triggered due to high load in the Radio Network Controller (RNC) 106 node, or due to lack of service support. The involved nodes are illustrated in FIG. 1. Either the directed retry is performed at establishment of the service or an inter system handover is performed after call establishment. A cause value "directed retry due to load" may be introduced in order to be able to distinguish a directed retry initiated due to load and a directed retry initiated due to lack of service support, or a directed retry initiated due to another reason.

The directed retry and inter system handovers from WCDMA to GSM received with a cause value indicating high load are treated as described above. At reception of the requests in the BSC node 104 in the GSM system, a check is made of the traffic load in the target GSM cell. If the traffic load in the target GSM cell is above a pre-defined on-loading threshold, incoming handover requests are rejected according to an example embodiment.

In order to avoid ping-pong handover between the GSM and the WCDMA when both networks have a traffic load around their respective traffic load limits, it is suggested that two traffic load thresholds are defined per network. A first traffic load threshold triggers off-loading from a first network to a second network, and a second traffic on-loading threshold is introduced that defines at which traffic load level incoming handovers to the first network from the second network are rejected. If the traffic off-loading threshold parameter is set to a value higher than the traffic on-loading threshold, ping-pong handover between the networks is avoided.

If the traffic load in the target GSM is below the on-loading threshold, the incoming handover request and directed retries are accepted and the call is handled as normally but when the calls are released the BSC orders the dual mode MS to stay in the GSM network as long as GSM coverage exists. This is made by setting the "Override 3G Measurement & 3G Evaluation Parameters" to suitable values in the Channel Release message. Thus, the dual mode MS shall not start to measure on WCDMA cells until the GSM signal strength has decreased below a certain threshold by e.g. using the existing parameters Qsearch_I and Qsearch_P. In addition, the cell reselection algorithm shall not take WCDMA cells into account until the GSM signal strength has decreased below the "evaluation threshold." Accordingly, the setting of the these parameters shall be done in such a way that the measurement of the WCDMA shall not start to early in order to save battery power in the terminal but not late in order to cope with fast changing GSM radio conditions. And at the same, the evaluation of the WCDMA cell should start first when getting close to the GSM coverage border. This means that the "evaluation threshold" shall be set to a value smaller value than the Qsearch_I and Qsearch_P parameters. Hence, in the following example the Qsearch_I and Qsearch_P are set to −80 dBm while the "evaluation threshold" is set to −98 dBm.

The dual mode MS will then camp in GSM as long as GSM coverage exists. Service requests are handled within the GSM network as long as the service is supported by GSM network.

It may also be possible for the core network to give a preference for how incoming calls to dual mode MSs camping in the GSM shall be treated. The term "order to stay in GSM" implies in this specification to set the "Override 3G Measurement & 3G Evaluation Parameters" in the Channel Release message" to values promoting GSM camping. The following behaviour may be applied:

```
IF handover cause is due to load or due to directed retry AND no service
indicator, is set THEN
    At call release order the MS to stay in GSM.
ELSE IF handover cause is due to load or due to directed retry AND
service indicator set to "Handover to UTRAN should be performed"
THEN
    At call release do not order the MS to stay in GSM.
ELSE IF handover cause is due to load or due to directed retry AND
service indicator set to "Handover to UTRAN should not/shall not be
performed" THEN
    At call release order the MS to stay in GSM.
ELSE IF handover cause is not due to load or not due to directed retry
AND no service indicator is set THEN
    At call release do not order the MS to stay in GSM.
ELSE IF handover cause is not due to load or not due to directed retry
AND service indicator set to "Handover to UTRAN should be performed"
THEN
    At call release do not order the MS to stay in GSM.
ELSE IF handover cause is not due to load or not due to directed retry
AND service indicator set to "Handover to UTRAN should not/shall not
be performed" THEN
    At call release order the MS to stay in GSM.
END.
```

It should be noted that the handover cause "due to load" implies that the cause of handover is high load, while the handover cause "directed retry" implies due to not supported service or due to shortage of resources. In the example above directed retry indicates due to not supported service or due to shortage of resources.

The idle mode dual mode MS will then camp in GSM according to the cell reselection algorithm and the individual setting of the parameters Qsearch_I, Qsearch_P and "evaluation threshold". Service requests are handled within the GSM network as long as the requested service is supported.

When the dual mode MS is camping in the GSM system and in the case when a service request is made for a Circuit Switched (CS) service not supported in GSM a directed retry is initiated towards the WCDMA network. This can for example be indicated by the CS core network by setting the Information Element Service Handover to "handover to WCDMA should be performed". The service is then established in the WCDMA network provided that the WCDMA cell load so admits, according to the traffic on-loading threshold parameter in the WCDMA network.

The CS call set-up handling is summarized below:

```
IF no service indicator is set THEN
    Normal call set-up handling.
ELSE IF service indicator set to "Handover to UTRAN should be
performed" THEN
    Trigger directed retry towards WCDMA.
ELSE IF service indicator set to "Handover to UTRAN should not/shall
not be performed" THEN
    Normal call set-up handling.
END.
```

When the dual mode MS is camping in the GSM system (i.e. when the "evaluation threshold and the Qsearch parameters are set to promote GSM camping) and in case a service request is made for a PS service not supported in GSM e.g. indicated by the PS core network by setting the Information Element (IE) Service UTRAN Cell Change Order (CCO) to "Network initiated cell change order procedure to UTRAN should be performed", a cell reselection towards WCDMA is required. This is done by sending a Packet Measurement Order message to the dual mode MS including an update of the individual cell reselection parameter setting such that it promotes cell reselection to WCDMA (e.g. the same values as broadcasted on BCCH/PBCCH). In case WCDMA coverage exists the dual mode MS will initiate a cell reselection towards WCDMA and the PS service is re-established in WCDMA assuming the WCDMA cell load so admits.

The PS call set-up handling is summarized below:

```
IF no service indicator is received from the packet core network THEN
    No update of the individual cell reselection parameter setting.
ELSE IF service indicator received from packet core network and set to
"Network initiated cell change order procedure to UTRAN should be
performed" THEN
    Trigger a cell reselection to UTRAN by changing the individual
    cell reselection parameter setting (sending of Packet Measurement Order
    message).
ELSE IF service indicator received from the packet core network and set
to "Network initiated cell change order procedure to UTRAN should
not/shall not be performed" THEN
    No update of the individual cell reselection parameter setting.
END.
```

It should be noted that at Inter BSC Handover (i.e handover from a first BSC to a second BSC), handover reasons must be passed to the second BSC in order for the second BSC to set cell reselection parameters correctly. A common 2G/3G network comprises a common Core Network, CN, (102) connected to a 2G controlling entity (104) which is further connected to dual mode mobile stations and to a 3G controlling entity (106) further connected to dual mode mobile stations. An example method comprises the steps of:

301. Apply a 3G camping strategy.

303. Direct a service request performed by a dual mode mobile station in the common 2G/3G network for a service supported by at least the 2G network to the 2G network if the dual mode station camps in the 3G network.

303. Instruct dual mode mobile stations to perform cell reselection evaluation of 3G network cells for 2G network camping mobiles only when the 2G network signal strength is below a predetermined threshold.

The method may be implemented in a 2G controlling entity, preferably a BSC, connectable to the common 2G/3G network. The 2G controlling entity comprises means for instructing dual mode mobile stations to perform cell reselection evaluation of 3G network cells for 2G network camping mobiles only when the 2G network signal strength is below a predetermined threshold.

Thus, the technology provides a method and arrangements in a common 2G/3G network applying a 3G camping strategy for moving a part of the dual mode MS to the 2G network from the 3G network, e.g. due to high load in the UMTS network and let them camp in GSM as long as they are using services that are provided by the GSM network. If a moved dual mode MS requires a service that are not supported in GSM or a service that is better served in 3G network the dual mode MS is returned to the 3G network. In a typical case, the traffic load in the 3G network may trigger the movement of dual mode MSs from the UMTS network to the GSM network while the services usage is triggering the movement back to the UMTS. It should however be noted, as described above, that there may be services that are only supported in the 2G network, which results in that the service usage also may trigger movement from UMTS to GSM.

In the drawings and specification, there have been disclosed non-limiting example embodiments. Although specific terms are employed, they are used in a generic and descriptive sense only and not for purposes of limitation. The scope of the invention is set forth in the claims.

The invention claimed is:

1. A method in a common 2G/3G network that includes a common Core Network (CN) connected to a 2G controlling entity for communicating with dual mode mobile stations and to a 3G controlling entity for communicating with dual mode mobile stations, the method comprising the steps of:
    applying a 3G camping strategy,
    directing a service request from a dual mode mobile station in the common 2G/3G network for a 2G-support service to the 2G network if the dual mode station is camped in the 3G network, and
    instructing the dual mode mobile station, when connected to the 2G network, to perform cell reselection evaluation of 3G network cells only when a signal strength detected in the 2G network is below a predetermined threshold,
    wherein the instructing step includes transmitting a first parameter, indicative of the predetermined threshold, that is set individually per mobile station and at least a second parameter that is set individually per mobile station,
    wherein the at least second parameter indicates when the dual mode mobile station should start to measure on signal strength on the 3G network.

2. The method of claim 1, wherein the individually set parameters are transmitted to the dual mode mobile station in a Channel Release message.

3. The method of claim 1, wherein the individually set parameters are transmitted to the dual mode mobile station in a Packet Measurement Order message.

4. The method of claim 1, wherein the individually set parameters are transmitted to the dual mode mobile station in a MBMS Assignment message or a MBMS Neighbour Cell Information message.

5. The method of claims 1, wherein the transmission of the parameters to the dual mode station is associated with an initialisation of the requested service.

6. The method of claim 1, wherein the individual setting indicated by the parameters lasts until at least one of the following criteria is fulfilled: a new individual setting has been received in a new Channel Release or a Packet Measurement Order message or another message, the dual mode mobile station changes Location Area, Routing Area, or both, the dual mode mobile station has changed radio access technology, the dual mode mobile station has powered off/on, and a session for the requested service is ended.

7. The method of claim 1, wherein the directing step is only performed if the traffic load of the 2G network is below a predetermined on-loading threshold.

8. The method of 1, wherein the 2G network is a GSM network, the 3G network is a UMTS, the 2G controlling entity is a Base Station Controller of said GSM network and that the 3G controlling entity is a Radio Network Controller of said UMTS.

9. A 2G controlling entity, for use in a common 2G/3G network that includes a common Core Network, configured to communicate with dual mode mobile stations and with a 3G controlling entity that also is configured to communicate with dual mode mobile stations, the 2G controlling entity comprising:
    means for applying a 3G camping strategy; and
    means for receiving a service request for a service at least supported by the 2G network performed by a dual mode mobile station;
    means for instructing the dual mode mobile station when connected to the 2G network to perform cell reselection evaluation of 3G network cells only when a signal strength detected in the 2G network is below a predetermined threshold,
    wherein the means for instructing includes means for transmitting a first parameter, indicative of the predetermined threshold, that is set individually per mobile station and means for setting at least a second parameter individually per mobile station, and
    wherein the at least second parameter indicates when the dual mode station should start to measure signal strength on the 3G network.

10. The 2G controlling entity of claim 9, further comprising means for transmitting the individually set parameters to the dual mode mobile station in a Channel Release message.

11. The 2G controlling entity of claim 9, further comprising means for transmitting the individually set parameters to the dual mode mobile station in a Packet Measurement Order message.

12. The 2G controlling entity (104) of claim 9, further comprising means for transmitting the individually set parameter(s) to the dual mode mobile station in a MBMS Assignment message or a MBMS Neighbour Cell Information message.

13. The 2G controlling entity (101) of claims 9, wherein the transmission of the parameter to the dual mode station is associated with an initialisation of the requested service.

14. The 2G controlling entity (104) of claims 9, wherein the individual setting indicated by the parameters lasts until at least one of the following criteria is fulfilled: a new individual setting has been received in a new Channel Release or a Packet Measurement Order (PMO) message or another message, the dual mode mobile station changes Location Area, Routing Area, or both, the dual mode mobile station has changed radio access technology, the dual mode mobile station has powered off/on and a session for the requested service is ended.

15. The 2G controlling entity (101) of claim 9, further comprising means for rejecting the service request for a service at least supported by the 2G network performed by a dual mode mobile station if the traffic load of the 2G network is below a predetermined on-loading threshold.

16. The 2G controlling entity (101) of claim 9, wherein the 2G network is a GSM network, the 3G network is a UMTS, the 2G controlling entity is a Base Station Controller of said GSM network and that the 3G controlling entity is a Radio Network Controller of said UMTS.

* * * * *